United States Patent Office  3,235,591
Patented Feb. 15, 1966

3,235,591
B-CARBOXYLIC PHOSPHINOBORINE ESTER POLYMERS AND THEIR PREPARATION
Marvin H. Goodrow, Claremont, Calif., assignor to American Potash & Chemical Corporation, Los Angeles, Calif., a corporation of Delaware
No Drawing. Filed Apr. 30, 1962, Ser. No. 191,277
4 Claims. (Cl. 260—545)

The present invention relates, in general, to the preparation of B-substituted phosphinoborine polymers and to the polymers thus prepared. More specifically, the invention relates to B-carboxylic esters of phosphinoborine polymers and to their methods of preparation.

It is known that phosphinoborine polymers are of value where high thermal and hydrolytic stability are desired. These materials are also known for their value as high temperature dielectric materials. One specific application for these materials is as laminating resins which, when used, for example, in combination with fibre glass, are very resistant to thermal, chemical and electrical attack.

It is often desired to vary the physical properties of phosphinoborine polymers to meet the needs of a specific application. Considerable difficulty has been encountered in tailoring specific phosphinoborine polymers to the desired characteristics due to the difficulty of applying various organic substituents to the polymer. Selection of specific organic groups can control to a certain extent, for example, the solubility, melting point and compatibility of a polymer in a given system.

The preparative methods heretofore available for the manufacture of B-substituted phosphinoborine polymers have been unable to accomplish the addition of carboxylic ester groups to phosphinoborine polymers.

B-substituted phosphinoborine polymers in which the substituted groups are carboxylic ester substituents have not heretofore been prepared.

Broadly, in accordance with the present invention, it has been determined that B-carboxylic esters of phosphinoborine polymers can be prepared by treating the corresponding B-halophosphinoborine polymers with certain aqueous carboxylic amides.

More specifically, the process of the present invention comprises reacting (I) a B-halophosphinoborine polymer having any of the general formulas:

(1) $[R_4R_3PBR_1R_2]_n$
(2) $[R_4R_3PBR_1R_2]_nA$
(3) $[R_2R_1BP(R_3)R(R_3)PBR_1R_2]_n$
(4) $[R_4R_3PBR_1R_2]_m[R_3PBR_1]_z$ mixtures and copolymers thereof with (II) a carboxylic amide having the formula:

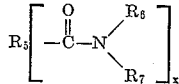

and water.

This reaction produces a B-carboxylic ester of the phosphinoborine polymer and by-product amine hydrohalides.

In the above formulas, $R_1$ and $R_2$ are each independently taken from the following group: halogen, hydrogen, aryl, alkyl, alkaryl and cycloalkyl substituents; at least one of said $R_1$ and $R_2$ being halogen in each of said polymers (1), (2), (3) and (4), each $R_1$ and $R_2$ substituent being independently selected for each monomeric unit. The substituents, $R_3$ and $R_4$, can be any of the single substituents: alkyl, aryl, alkaryl or cycloalkyl, each substituent being independently selected for each monomeric unit; or taken together as one single substituent: arylene, alkylene, alkarylene or cycloalkylene. The substituent R can be any of arylene, alkylene, alkarylene or cycloalkylene. The substituent $R_5$ can be any of the monovalent hydrogen, alkyl, aryl, alkaryl or cycloalkyl substituents or the bivalent arylene, alkylene, alkarylene or cycloalkylene substituents. The substituents, $R_6$ and $R_7$, can be any of the single substituents hydrogen, alkyl, aryl, alkaryl or cycloalkyl, each substituent being independently selected; or taken together as one single substituent, arylene, alkylene, alkarylene or cycloalkylene. The integer $x$ is equal to the valence of $R_5$.

The integer $n$ is indicative of the degree of polymerization of the polymers. The ratio of the integers $m$ to $z$ in the polymer (4) is indicative of the extent of ring fusion and is between about 0.1:1 and 6:1. The terminal groups of linear polymer (2) on one end of the chain are basic in nature, designated A, and can conveniently be tertiary amines, tertiary phosphines, secondary amines or secondary phosphines. While we do not wish to be limited to any theory, it is believed that the other end of the polymer (2) is blocked by an acidic —$B(R_1)_3$ group wherein $R_1$ is as defined above.

The B - halophosphinoborine polymers designated above as (1) through (4) are conveniently prepared by the halogenation of the corresponding hydridophosphinoborine polymer. One convenient method of halogenation is the treatment of the B-hydridopolymer with an N-halocarbamyl compound as is more specifically described in assignee's co-pending application Serial No. 191,272, filed April 30, 1962. For example, a typical halogenation reaction is as follows:

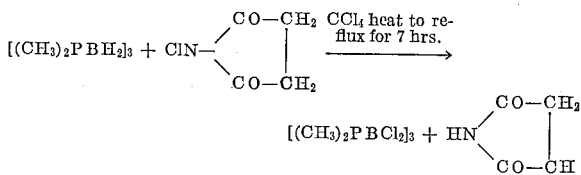

Also, the preparation of B-halophosphinoborine polymers which can be used in the present process is described in Burg et al., U.S. Patent No. 3,025,326, issued March 13, 1962.

It is disclosed in this Burg et al. patent that linear or cyclic phosphinoborine compounds can be treated with halogenating agents such as free halogens, hydrohalogen acids and reactive halogenated hydrocarbons, to produce the corresponding B-halophosphinoborine compounds.

The B-carboxylic phosphinoborine ester polymers of the invention have the general formulas:

(a) $[R_4R_3PB(E)_2]_n$
(b) $[R_4R_3PB(E)_2]_nA$
(c) $[(E)_2BP(R_3)R(R_3)PB(E)_2]_n$
(d) $[R_4R_3PB(E)_2]_m[R_3PBE]_z$ mixtures and copolymers thereof.

In the above formulas R, $R_3$, $R_4$, A, $n$, $m$ and $z$ have the same meaning as above and E can be any of hydrogen, alkyl, aryl, alkaryl, cycloalkyl,

or

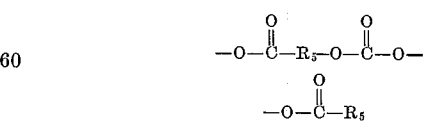

or substituents; provided there is at least one

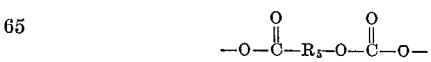

substituent in each of said polymers (a), (b), (c) and (d). The substituent $R_5$ has the same meaning as above. Each E substituent is independently selected for each position in each monomeric unit of these polymers. When E is bivalent, it serves to join two monomeric units together and is common to both. In this manner bivalent E substituents can be one of the monomeric units in the polymer or it can serve as a cross-linking agent.

The B-carboxylic esters of phosphinoborine polymers of this invention can be recovered, for example, from this reaction as a liquid, a solid, a solution dissolved in a suitable solvent or as a solid precipitate. The recovered polymer can be isolated by any of the conventional isolation procedures, such as crystallization, filtration and the like.

In order to illustrate the invention even more clearly, the following specific examples are set forth. It will be understood, of course, that these examples are for illustrative purposes only and are not intended to limit the invention in any way. In the following examples and throughout the specification and appended claims, all parts and percentages are by weight, unless otherwise specified.

EXAMPLE I

To 0.2055 g. (0.591 mmole) of $[(CH_3)_2PBH_2]_2(CH_3)_2PBHI$ is added 9.0 ml. of dimethylacetamide and 1.0 ml. of water and the mixture is heated to 100–105° C. After approximately one hour the colorless solution takes on a dark-yellow color which disappears after one-half hour to return to an almost colorless solution. The solution is maintained at 100–105° C. for a total of 4 hrs., cooled to room temperature and diluted with 25 ml. of water. After cooling to 0° C. the crystalline product is collected, thoroughly washed with water and air dried, to provide 0.0401 g. (0.143 mmole) of $[(CH_3)_2PBH_2]_2(CH_3)_2PBH(OOCCH_3)$ M.P. 45–47° C. Further purification is effected by high vacuum sublimation at a bath temperature of 30–35° C. from which 0.0345 g. of product, M.P. 43.5–45.5° C. is obtained.

EXAMPLE II

To 0.1500 g. (0.432 mmole) of $[(CH_3)_2PBH_2]_2(CH_3)_2PBHI$ in a 5 ml. heavy-wall tube is added 1.50 ml. of formamide and 0.30 ml. of water. The tube is sealed under vacuum and heated at 100±2° C. for 19 hrs. After opening on the vacuum line the noncondensable gas (presumably hydrogen) is removed and measured (2.99 cc., 0.133 mmole). The contents of the tube are removed and diluted with the aid of 10 ml. of water, cooled to 0° C. and the precipitate is collected and dried. The 0.0793 g. of crude product is primarily microcrystalline needles, M.P. 45.5–47° C., which forms on the addition of the water; however, it also contains several small pieces of a white, hard, brittle solid, M.P. 47–48.5° C., which analyzes (vapor phase chromatography) 76.8%

$[(CH_3)_2PBH_2]_2(CH_3)_2PBH(OOCH)$ 15.0% $[(CH_3)_2PBH_2]_2(CH_3)_2PBHF$ and 7.9% unknown. The microcrystalline material analyzes 92.3%

$[(CH_3)_2PBH_2]_2(CH_3)_2PBH(OOCH)$ 1.7% $[(CH_3)_2PBH_2]_2(CH_3)_2PBHI$ and 5.9% unknown. The yield of product is thus approximately 0.073 g. (0.27 mmole, 63%).

EXAMPLE III

A solution of 0.2013 g. (0.579 mmole) of $[(CH_3)_2PBH_2]_2(CH_3)_2PBHI$ in 9.0 ml. of dimethylformamide and 1.0 ml. of water is heated at 100–105° C. for 5 hrs. After cooling to room temperature and dilution with 25 ml. of water a white microcrystalline material preciptates from the colorless solution. The mixture is cooled in an ice bath and filtered. The thoroughly water-washed crystals are dried to obtain 0.1033 g. (0.389 mmole) of $[(CH_3)_2PBH_2]_2(CH_3)_2PBH(O_2CH)$ M.P. 45.5–46.5° C. (softening at 42° C.) which assayed 99.8% by vapor phase chromatography. The infrared spectrum showed significant absorption bands at 2840 (C—H in CHO), 1725 and 1703 (C—O), 1208 (C—O) and 1070 cm.$^{-1}$ (B—O—C).

Substantially the same procedures set forth in Example I, above, are employed in Examples IV to XXV, the reactants and major polymeric product of which are set forth in Table I.

*Table I*

| Example | Aqueous Reagent | B-Halophosphinoborine Polymer | B-Carboxylic Ester of a Phosphinoborine Polymer |
|---|---|---|---|
| IV | Adipamide | $[(CH_3)_2PBH_2]_2(CH_3)_2PBHI$ | $\{[(CH_3)_2PBH_2]_2(CH_3)_2PBH\}_2[O_2C(CH_2)_4CO_2]$ |
| V | Benzanilide | $[BrHB(CH_3)(CH_2)_3(CH_3)PBHBr]_2$-<br>$[(CH_3)_2PBHBr]_3$ | $[(C_6H_5CO_2)HBP(CH_3)(CH_2)_3(CH_3)PBH(O_2CC_6H_5)]_2$-<br>$[(CH_3)_2PBH(O_2CC_6H_5)]_3$ |
| VI | Phenylacetamide | 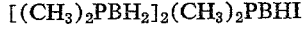 |  |
| VII | N-benzylformamide | 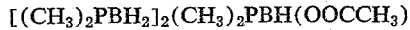 | 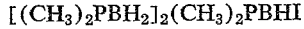 |
| VIII | N,N'-dimethylmalonamide | $[(C_8H_{17})(CH_3PBH)]_2(C_8H_{17})CH_3PBH_2$ | $\{[(C_8H_{17})CH_3PBH]_2(C_8H_{17})CH_3PBH_2\}_2\{O_2CCH_2CO_2\}$ |
| IX | N,N,N',N'-tetramethylsuccinimide | $[(CH_3)_2PBHCl]_3$ | $[(CH_3)_2PBH]_2[O_2C(CH_2)_2CO_2]_3$ |
| X | N-acetyl-2-benzazole | $[(cyclo-C_6H_{11})_2PBHBr]_4$ | $[(cyclo-C_6H_{11})_2PBH(O_2CCH_3)]_4$ |
| XI | n-Butyramide | $[(CH_3)_2PBH_2]_3[(CH_3)_2PBHBr]CH_3PBH$ | $(CH_3)_2PBH_2]_3\{(CH_3)_2PBH[O_2C(CH_2)_2CH_3]\}CH_3PBH$ |
| XII | Cyclohexylcarboxylicamide | $[(CH_3)_2PBH_2]_3(CH_3)_2PBHCl$ | 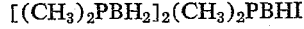 |
| XIII | 2-oxohexamethyleneimine | $[CH_2(CH_2)_3PBHCl]_3$ | 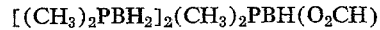 |
| XIV | N-methylacetamide | $[(CH_3)_2PBHCl]_{40}N(C_2H_5)_3$ | $[(CH_3)_2PBH(O_2CCH_3)]_{40}N(C_2H_5)_3$ |
| XV | N-t-butylformamide | $[(CH_3)_2PBH_2]_2(CH_3)_2PBHF$ | $(CH_3)_2PBH_2]_2(CH_3)_2PBH(O_2CH)$ |
| XVI | α-phenylacetamide | $[(CH_3)_2PBHI]_2(CH_3)_2PBH_2$ | $[(CH_3)_2PBH(O_2CCH_2C_6H_5)]_2(CH_3)_2PBH_2$ |
| XVII | Caprylamide | $[C_6H_5(CH_3)PBHBr]_3$ | $[C_6H_5(CH_3)PBH(O_2C)(CH_2)_6CH_3]_3$ |
| XVIII | N-phenylformanilide | $[C_6H_5BP(CH_3)(CH_2)_2(CH_3)PBH(O_2CH)]_{15}$ | $[(HCOO)HB(CH_3)(CH_2)_2(CH_3)PBH(O_2CH)]_{15}$ |
| XIX | N-benzoylpiperidine | $[(CH_3)(C_2H_5)PBHBr]_{80}P(CH_3)_3$ | $[(CH_3)(C_2H_5)PBH(O_2CC_6H_5)]_{80}P(CH_2)_3$ |
| XX | N,N-dicyclohexylformamide | $[Br_2BP(CH_3)C_6H_4(CH_3)PBBr_2]_{20}$ | $[(HCO_2)BP(CH_3)C_6H_4(CH_3)PB(O_2CH_2)]_{20}$ |
| XXI | N-phenylformamide | $[(CH_3)_2PBI_2]_3$ | $[(CH_3)_2PB(O_2CH)_2]_3$ |
| XXII | Terephthaldiamide | $[(CH_3)_2PBHBr]_2(CH_3)_2PBH_2$ | $\{(CH_3)_2PBH_2[CH_3)_2PBH]_2\}\{O_2CC_6H_4CO_2\}$ |
| XXIII | N,N-diethylbenzamide | $[(n-C_8H_{17})CH_3PBHCl]_3$ | $[(n-C_8H_{17})CH_3PBH(O_2CC_6H_5)]_3$ |
| XXIV | N,N-dimethylcaproamide | $[BrHBP(CH_3)(CH_2)_{12}(CH_3)PBHBr]_{10}$ | $\{[CH_3(CH_2)_5CO_2]HBP(CH_3)(CH_2)_{12}(CH_3)PBH$-<br>$[O_2C(CH_2)_5CH_3]\}_{10}$ |
| XXV | N-acetylcarbazole | $[(C_2H_5)CH_3PBCl_2]_{40}P(CH_3)_3$ | $[(C_2H_5)CH_3PB(O_2CCH_3)_2]_{40}P(CH_3)_3$ |

As illustrated in the foregoing examples, the process of the present invention can be carried out at a temperature within a range of about 25° C. to about 300° C., and preferably within a temperature range of about 35° C. to about 200° C.; however, temperature is not critical so long as the decomposition temperatures of the reactants and products are not exceeded.

The reaction can be carried out in the presence of a solvent or not, as desired. Preferred solvents which can be used according to the present invention include: aliphatic ethers such as diamyl ether, diheptyl ether, isobutyl neopentyl ether, disopropyl ether, dimethyl ether, ethylene glycol dimethylether, ethylene glycol diethylether, ethylene glycol dipropylether, ethylene glycol dibutylether, diethylene glycol dimethylether, diethylene glycol diethylether, diethylene glycol dipropylether, diethylene glycol dibutylether, triethylene glycol dimethylether, triethylene glycol diethylether, triethylene glycol dipropylether, triethylene glycol dibutylether, triethylene glycol dipropylether, triethylene glycol dibutylether, tetraethylene glycol dimethylether, tetraethylene glycol diethylether, diethyl ether, dipropyl ether, butyl ethyl ether, hexyl methyl ether; arene ethers such as anisole, phenetole, diphenyl ether, veratrole, benzyl phenyl ether; cyclic ethers such as tetrahydrofuran, dioxane, tetrahydropyran; arene or aliphatic hydrocarbons such as diisoamyl, hexane, n-hexadecane, cyclohexane, iso-octane, cyclopentane, trimethylpentane, 2-methylpentane, isopentane, methylcyclohexane, benzene, octadeacyclohexane, toluene, p-xylene, naphtha, butylbenzene, ethylbenzene, cumene, octadecylbenzene; alcohols such as ethylene glycol, methanol, i-propanol, ethanol, n-propanol, n-butanol, s-butanol, diethylene glycol, triethylene glycol, cyclohexanol, n-hexanol, 1,2-propanediol; ketones such as methyl ethyl ketone, acetone, acetophenone, methyl i-propyl ketone, diethyl ketone, cyclohexanone, methyl n-butyl ketone; amines such as butylamine, cyclohexylamine, piperidine, pyridine, aniline, N,N-dimethylanilene, hexylamine, p-toluidine, N,N-dimethylcyclohexylamine, 2-picoline; and the like. An excess of aqueous reagent is preferably used as the solvent.

Aqueous mixtures of solvents can be employed if desired. The aliphatic ether solvents are particularly useful because they are inert to the reactants and product, inexpensive, and readily available.

The stoichiometry of the reaction requires that water be present to produce the B-carboxylic esters, so water will always be included with the solvent if water alone is not the solvent.

The substituents, $R_1$, $R_2$, $R_3$, $R_4$, $R_5$, $R_6$, $R_7$ and E, as defined above, can be monovalent alicyclic, acyclic or arene substituents. Typical examples of these monovalent substituents include: aryl substituents such as phenyl, biphenylyl, naphthyl, and indanyl; alkaryl substituents such as cumenyl, tolyl, xylyl, mesityl, benzyl, phenylethyl, phenethyl, diphenylmethyl, α-methylbenzyl, trityl, 2-methylbenzyl and 3-phenylpropyl; alkyl substituents such as methyl, ethyl, propyl, butyl, amyl, neopentyl, decyl, hexyl, 2-methylpentyl, 5-methylhexyl, dodecyl and iso-octyl; and cycloalkyl substituents such as cyclohexyl, cyclopentyl, cycloheptyl, 4-methylcyclohexyl, 2,4,6-trimethylcyclohexyl and 3-isopropylcyclopentyl. Preferred substituents include the aryl substituent, phenyl; the alkaryl substituents, lower alkyl substituted phenyl; the lower alkyl substituents having from 1 to 12 carbon atoms; and the cycloalkyl substituents having 5 or 6 annular carbon atoms. These substituents have been found to produce the most desirable results. The most preferred substituents are the lower alkyl substituents having from 1 to 12 carbon atoms and the phenyl radical because the reactions proceed easily and the products are particularly useful and stable compounds.

The bivalent substituents, $R_3$ and $R_4$, when taken together as one single substituent, and $R_6$ and $R_7$, when taken together as one substituent, $R_5$ and R, as defined above, can be any of the bivalent arene, alicyclic or acyclic substituents. Typical examples of these bivalent substituents include: arylene substituents such as phenylene, naphthylene, acenaphthenylene and biphenylene; alkarylene substituents such as durylene, benzylidene, xylylene and tolylene; alkylene substituents such as methylene, ethylene, hexamethylene, neopentylene, isobutylene, propylene and tetramethylene; and cycloalkylene substituents such as cyclohexylene and cyclopentylene. Preferred substituents include the aryl substituent, phenylene; the alkarylene substituents which are lower alkyl substituted phenylene; the lower alkylene substituents having from 1 to 12 carbon atoms; and the cycloalklylene substituents having 5 or 6 annular carbon atoms. The most preferred substituents are the lower alkylene substituents having from 1 to 12 carbon atoms. These substituents have been found to produce the most desirable results and the reactions proceed easily in their presence.

The B-halophosphinoborine polymers used according to this invention include the following:

$[(CH_3)_2PBH_2]_2(CH_3)_2PBHF$
$(CH_3)_2PBH_2[(CH_3)_2PBHI]_2$
$[(CH_3)_2PBHCl]_3$
$[(CH_3)_2PBHI]_3$
$[(CH_3)_2PBHCl]_2(CH_3)_2PBCl_2$
$[(CH_3)_2PBHBr]_2(CH_3)_2PBBr_2$
$[(CH_3)_2PBI]_2(CH_3)_2PBI_2$
$(CH_3)_2PBHCl[(CH_3)_2PBCl_2]_2$
$(CH_3)_2PBHBr[(CH_3)_2PBBr_2]_2$
$(CH_3)_2PBHI[(CH_3)_2PBI_2]_2$
$[(CH_3)_2PBF_2]_3$
$[(CH_3)_2PBH_2]_3(CH_3)_2PBHBr$
$[(CH_3)_2PBH_2]_3[(CH_3)_2PBHBr]CH_3PBH$
$[(C_2H_5)_2PBF_2]_3$
$[(CH_3)_2PBH_2]_2(CH_3)_2PBHCl$
$(CH_3)_2PBH_2[(CH_3)_2PBHCl]_2$
$[(CH_3)_2PBCl_2]_3$
$CH_3(C_2H_5)PBHCl[CH_3(C_2H_5)PBCl_2]_2$
$[CH_3(C_2H_5)PBCl_2]_3$
$[(CH_3)_2PBH_2]_2(CH_3)_2PBHBr$
$(CH_3)_2PBH_2[(CH_3)_2PBHBr]_2$
$[(CH_3)_2PBHBr]_3$
$[(CH_3)_2PBBr_2]_3$
$[(CH_3)_2PBH_2]_2(CH_3)_2PBHI$
$[(CH_3)_2PBI_2]_3$
$[(CH_3)_2P]_4B_4H_2Cl_6$
$[(CH_3)_2PBH_2]_3[(CH_3)_2PBHI]CH_3PBH$
$[(CH_3)_2PBCl_2[_4_0N(C_2H_5)_3$
$[(CH_3)_2PBCl_2]_4CH_3PBH$

The following specific compounds exemplify the general structure of the polymers used in this invention:

A typical B-halophosphinoborine polymer which is characteristic of the structure of polymers having the general Formula 1 $[R_4R_3PBR_1R_2]_n$ is the trimeric B-bromo-P-dimethylphosphinoborine where $n$ equals 3 having the structural formula:

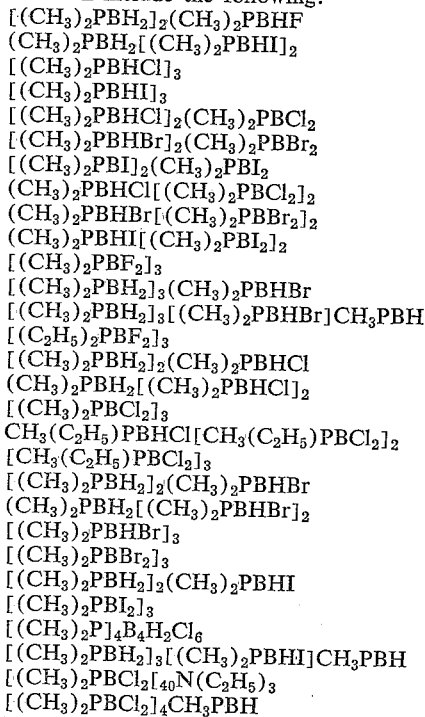

A typical B-halophosphinoborine polymer which is characteristic of the structure of polymers having the general Formula 2 $[R_4R_3PBR_1R_2]_nA$ is the linear polymer B-iodo-P-dimethylphosphinoborine having a degree of polymerization of 3, terminated with an acidic borine group on one end and a basic secondary phosphine on the other, and having the structural formula:

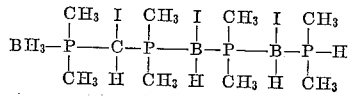

A typical B-halophosphinoborine polymer which is characteristic of the structure of polymers having the general Formula 3 $[R_2R_1BP(R_3)B(R_3)PBR_1R_2]_n$ is the separate ring polymer having the formula:

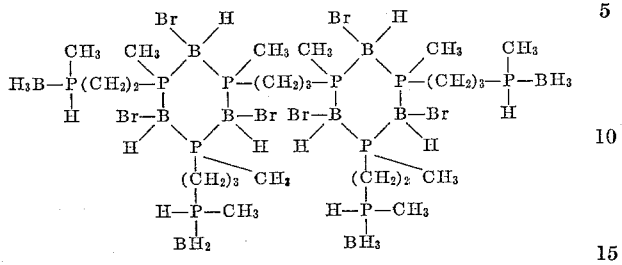

A typical B-halophosphinoborine polymer which is characteristic of the structure of polymers having the general Formula 4 $[R_4R_3PBR_1R_2]_m[R_3PBR_1]_z$ is the fused ring polymer having the formula:

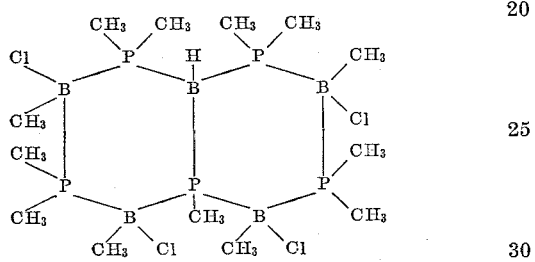

The polymer which has the general Formula 3 is terminated, as indicated above in the specific structural formula, with acidic groups. The number of acidic groups varies with the specific structure of the polymer and can range from 4 to about $n+2$. The acidic terminating groups on polymer (3) can be any of those defined above with reference to Formula 1. These groups are acidic by the Lewis acid concept of acidity.

The terminating group, A, in polymer (2) is basic in nature. Substantially any groups, organic or inorganic, which are basic enough to attach to the acidic boron group, which is the end of the polymer chain, will terminate the chain. Convenient terminating groups include the secondary and tertiary phosphines and amines which can be represented by the general formula $-D(R_6)_3$ where D is either phosphorous or nitrogen and $R_6$ is as defined above with the proviso that no more than one $R_6$ in any one group is hydrogen. The nature of the inert basic end groups is not critical in this invention since it does not enter into the reaction in any way and is present only because any linear polymer must be terminated in order to prevent cyclization.

The ratio of $m$ to $z$ in polymer (4), above, determines the extent to which the rings in the polymer are fused together. The larger $z$ is with respect to $m$ the greater the number of ring fusions in the polymer. Thus, if the ratio of $m$ to $z$ is 1:1 or less, the rings are highly fused, while if the ratio is about 6:1, generally the rings are larger and contain more annular phosphinoborine groups with few ring fusions. The ratio of $m$ to $z$ can be as low as about 0.1:1 and as high as about 6:1. Preferably the ratio of $m$ to $z$ is between about 0.5:1 and 4:1 since these are the easiest to produce and have very desirable physical properties. Polymers which have a ratio close to 0.5:1 are highly cross-linked solids while those having a ratio close to 4:1 are generally viscous liquids.

The integer $n$, which is indicative of the degree of polymerization of polymers (1) through (2), can range from two for the simple linear polymers and three for the simple cyclic polymers through 3,000 and even higher.

As will be understood by those skilled in the art, what has been described is the preferred embodiment of the invention; however, many modifications, changes and substitutions can be made therein without departing from the scope and the spirit of the following claims.

I claim:
1. The B-carboxylic ester of a phosphinoborine polymer $[R_4R_3PB(E)_2]_n$, wherein
   E is independently selected for each position on each monomeric unit from the group consisting of lower alkylene, cyclohexylene, phenylene, formyloxy, benzoyloxy, lower alkanoyloxy, cyclohexanoyloxy, phenylacetyloxy, lower alkanedioyloxy and benzenedioyloxy substituents, at least one of said E substituents being selected from the group consisting of formyloxy, benzoyloxy, lower alkanoyloxy, cyclohexanoyloxy, phenylacetyloxy, lower alkanedioyloxy and benzenedioyloxy substituents in said polymer;
   $R_3$ and $R_4$ are selected for each monomeric unit from the group consisting of lower alkyl, cyclohexyl and phenyl substituents; and
   $n$ is an integer indicative of the degree of polymerization of said polymer.
2. $[(CH_3)_2PBH_2]_2(CH_3)_2PBH(OOCCH_3)$.
3. $[(CH_3)_2PBH_2]_2(CH_3)_2PBH(OOCH)$.
4. Process for the production of the B-carboxylic ester of a phosphinoborine polymer comprising:
   (a) admixing and
   (b) reacting
       (I) the B-halophosphinoborine polymer
       $[R_4R_3PBR_1R_2]_n$
   wherein
       $R_1$ and $R_2$ are each independently selected for each monomeric unit from the group consisting of halogen, hydrogen, lower alkyl, cyclohexyl and phenyl substituents; at least one of said $R_1$ and $R_2$ being halogen in said polymer;
       $R_3$ and $R_4$ are selected for each monomeric unit from the group consisting of lower alkyl, cyclohexyl and phenyl substituents;
       $n$ is an integer indicative of the degree of polymerization of said polymers; with
       (II) water and a carboxylic amide selected from the group consisting of

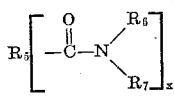

and

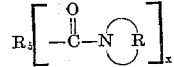

wherein
       $R_5$ is selected from the group consisting of hydrogen, lower alkyl, phenyl, cyclohexyl, benzyl, lower alkylene and phenylene substituents;
       $R_6$ and $R_7$ are selected from the group consisting of hydrogen, phenyl, lower alkyl, benzyl and cyclohexyl substituents;
       R is a lower alkylene substituent;
       $x$ is an integer equal to the valence of $R_5$; and
   (c) recovering said B-carboxylic ester of a phosphinoborine polymer.

References Cited by the Examiner
UNITED STATES PATENTS 2,969,342   1/1961   Konig et al. _____ 260—454 X
3,025,326   3/1962   Burg et al. _____ 260—543 X

OTHER REFERENCES

Gerrard et al.: "J. Chem. Soc. (London)" (1960), pp. 2141–2151.

LORRAINE A. WEINBERGER, *Primary Examiner.*

CHARLES B. PARKER, *Examiner.*